(12) United States Patent
Kula (10) Patent No.: US 11,568,149 B2
(45) Date of Patent: Jan. 31, 2023

(54) METHOD AND DEVICE FOR FACILITATING EFFICIENT TRAVERSAL OF NATURAL LANGUAGE SEQUENCES

(71) Applicant: TD Ameritrade IP Company, Inc., Omaha, NE (US)

(72) Inventor: John Scott Kula, Sinking Spring, PA (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 264 days.

(21) Appl. No.: 16/794,149

(22) Filed: Feb. 18, 2020

(65) Prior Publication Data

US 2021/0256219 A1 Aug. 19, 2021

(51) Int. Cl.
| | |
|---|---|
| *G06F 40/30* | (2020.01) |
| *G06F 16/22* | (2019.01) |
| *G06F 40/205* | (2020.01) |
| *G06N 5/04* | (2006.01) |

(52) U.S. Cl.
CPC .......... *G06F 40/30* (2020.01); *G06F 16/2282* (2019.01); *G06N 5/04* (2013.01); *G06F 40/205* (2020.01)

(58) Field of Classification Search
CPC .... G06F 40/30; G06F 16/2282; G06F 40/205; G06F 16/3329; G06F 40/35; G06N 5/04; G06Q 10/0637
USPC ........................................................... 704/9
See application file for complete search history.

(56) References Cited

U.S. PATENT DOCUMENTS

| | | | | |
|---|---|---|---|---|
| 8,055,560 | B2* | 11/2011 | Gelerman | G06F 21/6218 705/40 |
| 2002/0078162 | A1* | 6/2002 | Kimura | H04L 29/06 709/227 |
| 2002/0165744 | A1* | 11/2002 | Juras | G06Q 10/06375 705/7.37 |
| 2004/0107415 | A1* | 6/2004 | Melamed | G06F 11/3684 717/124 |
| 2007/0067196 | A1* | 3/2007 | Usui | G06Q 10/06 705/7.12 |
| 2009/0216772 | A1* | 8/2009 | Goldfarb | G06Q 10/10 |

(Continued)

*Primary Examiner* — Akwasi M Sarpong
(74) *Attorney, Agent, or Firm* — Harness, Dickey & Pierce, P.L.C.

(57) ABSTRACT

A computer system includes memory storing computer-executable instructions and a processor configured to execute the computer-executable instructions. The computer-executable instructions include building a questions table including multiple first questions and multiple potential requirements to which the first questions correspond, respectively. The computer-executable instructions include adding, to the questions table, one or more second questions, each of which correspond to at least two requirements from among the potential requirements. The computer-executable instructions include adding, to the questions table, for each second question among the one or more second questions, the at least two requirements to which the second question corresponds. The computer-executable instructions include determining a question, from among the first questions and the second questions, that corresponds to a highest number of potential requirements, and displaying the determined question to a user.

20 Claims, 5 Drawing Sheets

310

| Question | Y_Requirements | N_Requirements | Count | | Requirement | Source |
|---|---|---|---|---|---|---|
| Q002 | | R004 | 1 | | R001 | Q006 |
| Q003 | R003 | R004 | 2 | | R002 | Q006 |
| Q004 | R004 | | 1 | | R004 | Q003 |
| | | | | | | |
| Q007 | R003 | | 1 | | | |

(56) References Cited

U.S. PATENT DOCUMENTS

| | | | |
|---|---|---|---|
| 2013/0311224 A1* | 11/2013 | Heroux | G06Q 30/018 |
| | | | 705/7.15 |
| 2016/0094681 A1* | 3/2016 | Wu | H04L 67/02 |
| | | | 709/203 |
| 2017/0262387 A1* | 9/2017 | Sell | G06F 12/1441 |
| 2018/0189690 A1* | 7/2018 | Chan | G06F 8/20 |
| 2019/0155802 A1* | 5/2019 | Miller | G06F 16/235 |
| 2020/0159712 A1* | 5/2020 | Nelson | G06F 16/2272 |
| 2021/0124804 A1* | 4/2021 | Zhang | G06F 16/9027 |

\* cited by examiner

| Question | Y_Requirements | N_Requirements | Count |
|---|---|---|---|
| Q001 | R001 | | |
| Q002 | R002 | R004 | |
| Q003 | R003 | R004 | |
| Q004 | R004 | | |
| Q005 | R005 | | |

| Question | Y_Requirements | N_Requirements | Count |
|---|---|---|---|
| Q001 | R001 | | |
| Q002 | R002 | R004 | |
| Q003 | R003 | R005 | |
| Q004 | R004 | | |
| Q005 | R005 | | |
| Q006 | R001, R002 | R005 | |
| Q007 | R002, R003 | R005 | |

| Question | Y_Requirements | N_Requirements | Count |
|---|---|---|---|
| Q001 | R001 | | 1 |
| Q002 | R002 | R004 | 2 |
| Q003 | R003 | R005 | 2 |
| Q004 | R004 | | 1 |
| Q005 | R005 | | 1 |
| Q006 | R001, R002 | R005 | 3 |
| Q007 | R002, R003 | R005 | 3 |

| Question | Y_Requirements | N_Requirements | Count |
|---|---|---|---|
| Q001 | ~~R001~~ | | 1 |
| Q002 | ~~R002~~ | R004 | 2 |
| Q003 | R003 | R004 | 2 |
| Q004 | R004 | | 1 |
| Q005 | ~~R005~~ | | 1 |
| ~~Q006~~ | ~~R001, R002~~ | ~~R005~~ | 3 |
| Q007 | ~~R002,~~ R003 | ~~R005~~ | 3 |

320

| Requirement | Source |
|---|---|
| R001 | Q006 |
| R002 | Q006 |

| Question | Y_Requirements | N_Requirements | Count |
|---|---|---|---|
| Q002 | | R004 | 2 |
| Q003 | R003 | R004 | 2 |
| Q004 | R004 | | 1 |
| Q007 | R003 | | 3 |

| Question | Y_Requirements | N_Requirements | Count |
|---|---|---|---|
| Q002 | | R004 | 1 |
| Q003 | R003 | R004 | 2 |
| Q004 | R004 | | 1 |
| Q007 | R003 | | 1 |

| Question | Y_Requirements | N_Requirements | Count | | Requirement | Source |
|---|---|---|---|---|---|---|
| Q002 | | ~~R004~~ | 1 | | R001 | Q006 |
| ~~Q003~~ | ~~R003~~ | ~~R004~~ | 2 | | R002 | Q006 |
| Q004 | ~~R004~~ | | 1 | | R004 | Q003 |
| Q007 | ~~R003~~ | | 1 | | | |

| Question | Y_Requirements | N_Requirements | Count | | Requirement | Source |
|---|---|---|---|---|---|---|
| ~~Q002~~ | | | 1 | | R001 | Q006 |
| ~~Q004~~ | | | 1 | | R002 | Q006 |
| ~~Q007~~ | | | 1 | | R004 | Q003 |

FIG. 3H

METHOD AND DEVICE FOR FACILITATING EFFICIENT TRAVERSAL OF NATURAL LANGUAGE SEQUENCES

FIELD

The present disclosure relates to methods and devices for generating condensed data structures and more particularly to methods and devices for condensed data structures for efficient traversal of natural language sequences.

BACKGROUND

When planning a project, such as developing a new product, or implementing a new system, a requirements generation process may be conducted in order to determine which requirements, from among a plurality of existing potential requirements, are requirements of the project. If a number of existing potential requirements is large, requirements generation may include asking several different people long lists of questions. Generating requirements for a project in such a manner may lead to inconsistent answers, and thus, ambiguity with respect to the requirements of the project. The above-referenced issues may become more pronounced as a number of people working on a project increases. Thus, for projects involving large teams of people, requirements generation may be a particularly time-consuming and the chances of experiencing inconsistent results may be substantial.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory storing computer-executable instructions; and a processor configured to execute the computer-executable instructions. The computer-executable instructions include: building a questions table including a plurality of first questions and a plurality of potential requirements to which the plurality of first questions correspond, respectively adding, to the questions table, one or more second questions each of which correspond to at least two requirements from among the plurality of potential requirements, adding, to the questions table, for each second question among the one or more second questions, the at least two requirements to which the second question corresponds, determining a question, from among the first questions and the second questions, that corresponds to a highest number of potential requirements, and displaying the determined question to a user.

In other features, the computer-executable instructions include receiving an answer to the displayed question, and deleting the answered question from the questions table.

In other features, the computer-executable instructions include deleting one or more requirements corresponding to the answered question from the entire questions table, and adding the one or more requirements corresponding to the answered question to a requirements table.

In other features, the computer-executable instructions include determining one or more questions, from among the plurality of first questions and one or more second questions included in the questions table, that correspond to no requirements included in the questions table, and deleting the determined one or more questions from the questions table.

In other features, the computer-executable instructions include determining whether the questions table is empty, and in response to determining that the questions table is empty, displaying the requirements table to the user.

In other features, the computer-executable instructions include determining whether the questions table is empty, and in response to determining that the questions table is not empty, determining a next question, from among questions remaining in the questions table, that corresponds to a highest number of potential requirements, and displaying the determined next question to the user.

In other features, the computer-executable instructions include receiving an answer to the displayed next question, and deleting the answered next question from the questions table.

A requirements generation method includes building a questions table including a plurality of first questions and a plurality of potential requirements to which the plurality of first questions correspond, respectively. In other features, the requirements generation method includes adding, to the questions table, one or more second questions each of which correspond to at least two requirements from among the plurality of potential requirements. In other features, the requirements generation method includes adding, to the questions table, for each second question among the one or more second questions, the at least two requirements to which the second question corresponds. In other features, the requirements generation method includes determining a question, from among the first questions and the second questions, that corresponds to a highest number of potential requirements. In other features, the requirements generation method includes displaying the determined question to a user.

In other features, the requirements generation method includes receiving an answer to the displayed question; and deleting the answered question from the questions table.

In other features, the requirements generation method includes deleting one or more requirements corresponding to the answered question from the entire questions table; and adding the one or more requirements corresponding to the answered question to a requirements table.

In other features, the requirements generation method includes determining one or more questions, from among the plurality of first questions and one or more second questions included in the questions table, that correspond to no requirements included in the questions table; and deleting the determined one or more questions from the questions table.

In other features, the requirements generation method includes determining whether the questions table is empty; and in response to determining that the questions table is empty, displaying the requirements table to the user.

In other features, requirements generation method includes determining whether the questions table is empty, and in response to determining that the questions table is not empty, determining a next question, from among questions remaining in the questions table, that corresponds to a highest number of potential requirements, and displaying the determined next question to the user.

In other features, the requirements generation method includes receiving an answer to the displayed next question, and deleting the answered next question from the questions table.

A non-transitory computer-readable medium stores computer-executable instructions that, when executed by a processor, cause the processor to perform operations. The operations include building a questions table including a plurality of first questions and a plurality of potential requirements to which the plurality of first questions correspond, respectively; and adding, to the questions table, one or more second questions each of which correspond to at least two requirements from among the plurality of potential requirements. The operations also include adding, to the questions table, for each second question among the one or more second questions, the at least two requirements to which the second question corresponds; and determining a question, from among the first questions and the second questions, that corresponds to a highest number of potential requirements. The operations also include displaying the determined question to a user.

In other features, the computer-executable instructions include: receiving an answer to the displayed question, and deleting the answered question from the questions table.

In other features, the computer-executable instructions include deleting one or more requirements corresponding to the answered question from the entire questions table; and adding the one or more requirements corresponding to the answered question to a requirements table.

In other features, the computer-executable instructions include determining one or more questions, from among the plurality of first questions and one or more second questions included in the questions table, that correspond to no requirements included in the questions table; and deleting the determined one or more questions from the questions table.

In other features, the computer-executable instructions include determining whether the questions table is empty; and in response to determining that the questions table is empty, displaying the requirements table to the user.

In other features, the computer-executable instructions include determining whether the questions table is empty; and in response to determining that the questions table is not empty, determining a next question, from among questions remaining in the questions table, that corresponds to a highest number of potential requirements, and displaying the determined next question to the user.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The present disclosure describes a requirements generation device and process that improve the performance of requirements generation system by, for example, reducing a duration of requirement generation procedures that are performed using the requirements generation system, and thus, reducing one or more of a power consumption and a processing load of the requirements generation system.

As is discussed in greater detail, the requirements generation device implements a requirements identifying process that reduces a number of questions needed to identify which requirements, among a plurality of existing potential requirements, are requirements of a particular project.

Figure 1:
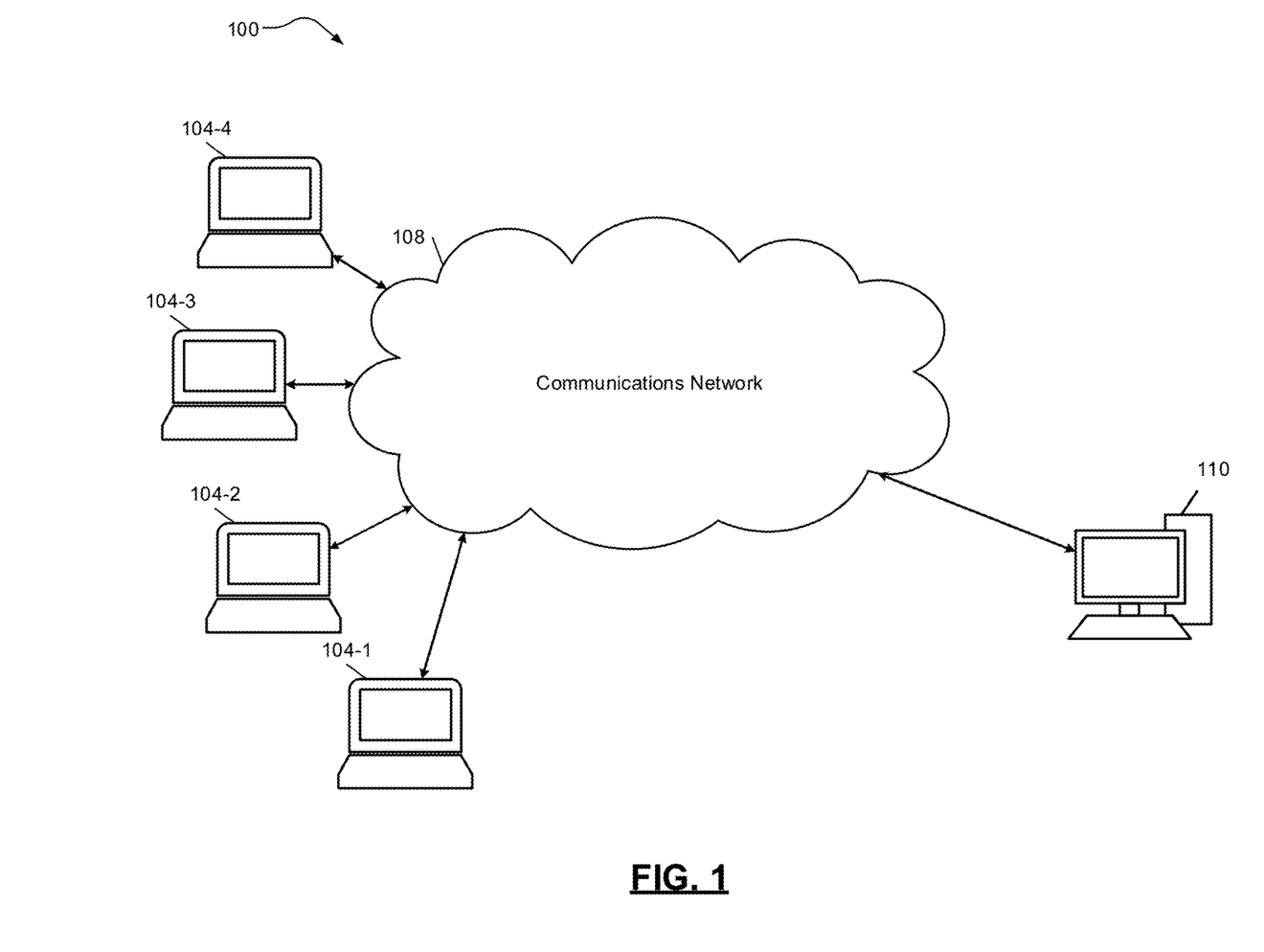
FIG. 1 is a functional block diagram of an example requirements generation system according to the principles of the present disclosure.

FIG. 1 illustrates a requirements generation system 100. The requirements generation system 100 may include a requirements generation device 110 and a plurality of user devices 104 including first through fourth user devices 104-1-104-4. The requirements generation device 110 and the plurality of user devices 104 are capable of performing wired and/or wireless communications with each other via communications network 108. The communications network 108 may be any network capable of transmitting electronic data. Example of the communications network 108 include, but are not limited to, a wireless communications network such as a cellular network or a WiFi network, a local area network (LAN), and the Internet.

According to at least one example embodiment of the inventive concepts, the requirements generation device 110 may include or be implemented by one or more circuits or circuitry (e.g., hardware) specifically structured to carry out and/or control some or all of the operations described in the present disclosure as being performed by the requirements generation device 110 (or an element thereof). According to at least one example embodiment of the inventive concepts, the requirements generation device 110 may include or be implemented by a memory and one or more processors executing computer-readable code (e.g., software and/or firmware) that is stored in the memory and includes instructions for causing the one or more processors to carry out and/or control some or all of the operations described in the present disclosure as being performed by the requirements generation device 110 (or an element thereof). According to at least one example embodiment of the inventive concepts, the requirements generation device 110 may be implemented by, for example, a combination of the above-referenced hardware and one or more processors executing computer-readable code.

The requirements generation device 110 may be, for example a desktop computer of a server. Each of the user devices 104 may each be, any one of, for example, a laptop, a desktop computer, a smart phone, a tablet, a personal digital assistant, and an a wearable device.

The requirements generation device 110 may perform a requirements generation function by supplying a plurality of requirement-related questions to one or more subject matter experts (SMEs) associated with a particular project. The requirements generation device 110 may receive answers to the supplied questions. For large projects, a number of SMEs involved may be great, and the SMEs may be located in different place. Thus, according to at least some example embodiments, SMEs may use user devices such first through fourth user devices 104-1-104-4 of the requirements generation system 100 in order to receive questions from, and provide answers to, the requirements generation device 110. People associated with a project for which requirements are being generated may use the answers received by the requirements generation device 110 to determine requirements of the project.

As a number of existing potential requirements associated with a project increases, a number of questions asked in order to determine the requirements of the project may increase as well. As number of questions asked in order to determine the requirements of the project, a duration of use, an amount of power consumption and/or a computational burden of the requirements generation device 110 may increase as well.

Figure 2:
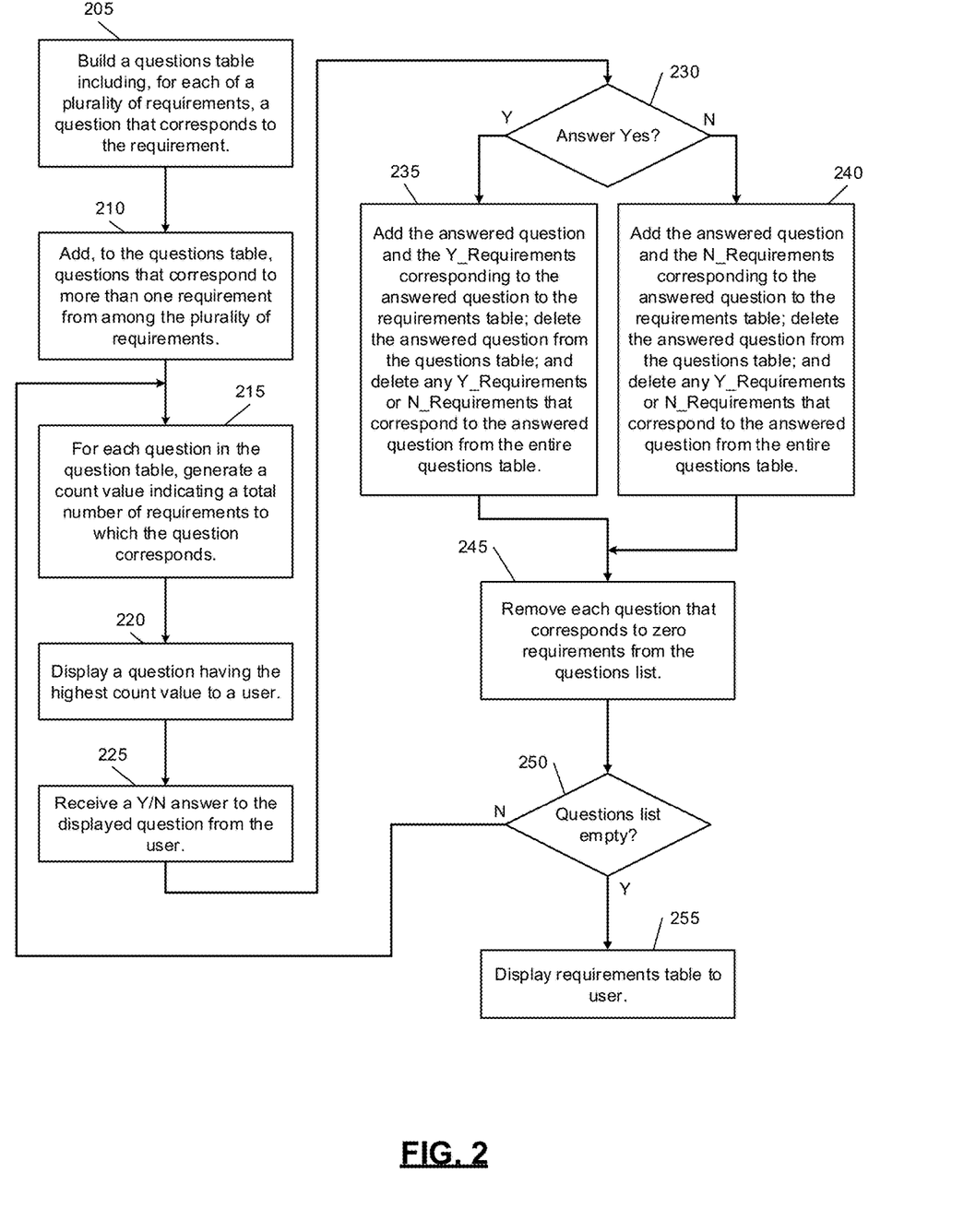
FIG. 2 is a flowchart depicting an example requirements identification process according to the principles of the present disclosure.

FIG. 2 is a flowchart depicting an example requirements identification process according to the principles of the present disclosure. As is discussed in greater detail below, when the requirements generation device 110 performs requirements generation in accordance with the requirements identification process of FIG. 2, a number of questions needed to determine requirements of project may become reduced. Accordingly, a duration of use, an amount of power consumption and/or a computational burden of the requirements generation device 110 may become reduced as well.

Referring to FIG. 2, in operation 205, the requirements generation device 110 builds a questions table. The questions table includes, for each of a plurality of existing potential requirements associated with a particular project, a question that corresponds to the requirement. Accordingly, with respect to the questions included in the questions table at operation 205, for each question, at least one answer to that question (e.g., "Yes" or "No") identifies the requirement corresponding to the question as a requirement of the project.

Figure 3A:
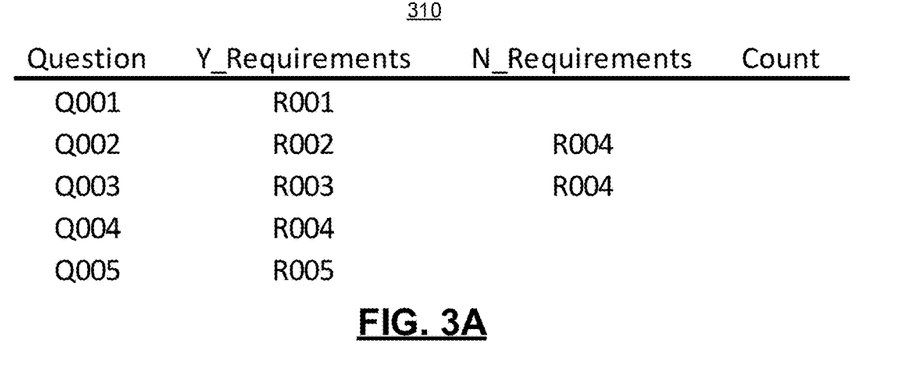
FIGS. 3A-3H illustrate examples of a questions table and a requirements table at various stages of the example requirements identification process of FIG. 2 according to the principles of the present disclosure.

FIG. 3A illustrates an example state of a questions table 310 after operation 205. As is illustrated in FIG. 3A each of first through fifth questions Q001-Q005 corresponds to at least one of a yes-condition requirement and a no-condition requirement. Yes-condition requirements ("Y_Requirements") are each a requirement that is identified as a requirement of the project when an answer to the question corresponding to the yes-condition requirement is "yes." No-condition requirements ("N_Requirements") are each a requirement that is identified as a requirement of the project when an answer to the question corresponding to the no-condition requirement is "no."

Figure 3B:
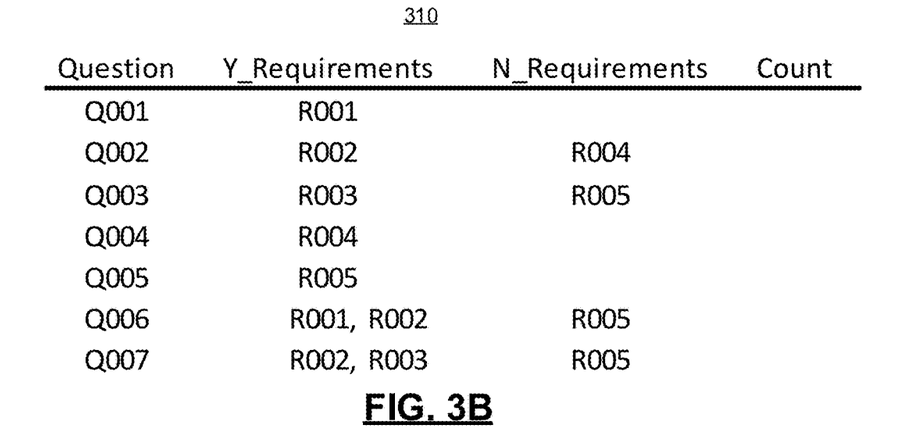

Returning to FIG. 2, in operation 210, the requirements generation device 110 adds, to the questions table, questions that correspond to more than one requirement from among the plurality of existing potential requirements associated with the project. For example, according to at least some example embodiments, in operation 210, the requirements generation device 110 adds one or more questions that correspond to at least two yes-condition requirements or at least two no-condition to the questions table 310. For example, FIG. 3B illustrates an example state of the questions table 310 after operation 210. As is shown in FIG. 3B, sixth and seventh questions Q006 and Q007 are added to the questions table 310. Further, unlike first through fifth questions Q001-Q005, sixth question Q006 corresponds to two yes-condition requirements (i.e., first requirement R001 and second requirement R002), and seventh question Q007 also corresponds to two yes-condition requirements (i.e., second requirement R002 and fifth requirement R005).

Figure 3C:
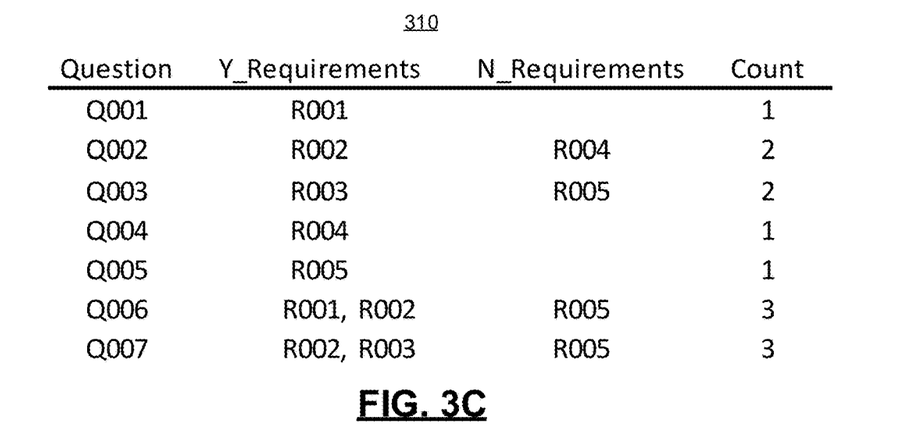

Returning to FIG. 2, in operation 215, the requirements generation device 110 generates, for each question in the questions table 310, a count value indicating a total number of requirements to which the question corresponds. For example, FIG. 3C illustrates an example state of a questions table 310 after operation 215. As is illustrated in FIG. 3C, the questions table 310 include a "Count" value that indicates a total number of requirements (i.e., yes-condition requirements and no-condition requirements).

Returning to FIG. 2, in operation 220, the requirements generation device 110 displays the question having the highest count value to a user. For example, if the requirements generation device 110 is performing a requirements generation operation with a SME located in proximity of the requirements generation device 110, the requirements generation device 110 may display the question having the highest count value to the SME via a display (e.g., display panel or monitor) of the requirements generation device 110. Further, if, for example the requirements generation device 110 is performing a requirements generation operation with the SME and the SME is communicating with the requirements generation device 110 via one of first through fourth users devices 104-1-104-4, the requirements generation device 110 may cause the user device being used by the SME to display the question having the highest count value to the SME.

As is illustrated in FIG. 3C, the fifth and sixth questions Q005 and Q006 are tied for highest count value. Thus, according to at least some example embodiments, the fifth question Q005 is determined, by the requirements generation device 110, to be the question having the highest count value in operation 220 because the fifth question Q005 is in front of the sixth question Q006, as is illustrated in FIG. 3C.

In operation 225, the requirements generation device 110 receives an answer, from the SME, to the displayed question. According to at least some example embodiments, the answer may be "yes" or "no."

In operation 230, the requirements generation device 110 determines whether the answer received in operation 225 is "yes." If the requirements generation device 110 determines that the answer received in operation 225 was "yes," the requirements generation device 110 proceeds to operation 235.

In operation 235, the requirements generation device 110 adds the answered question and the corresponding yes-condition requirements to a requirements table, deletes the answered question, and deletes any yes-condition requirements or no-condition requirements that correspond to the answered question from the entire table. For example, in operation 235, the requirements generation device 110 may walk the entire questions table 310, delete every instance in the questions table 310 of each yes-condition requirement that corresponds to the question answered in operation 225, and delete every instance in the questions table 310 of each no-condition requirement that corresponds to the question answered in operation 225.

In various implementations, deletion may be replaced with tagging. For example, a single bit may be associated with each question; when the question is added to the requirements table, the bit associated with the existing question can be set to indicate that the question is answered. Then, instead of checking whether the table of questions is empty, a check can be performed to see that all of the bits are set. Similarly, each yes-condition requirement and no-condition requirement may have an associated bit that can be set to indicate completion rather than actually performing a deletion.

In various other implementations, the underlying data structure for one or more tables may implement a row deletion using a flag for each row, an index of deleted rows, etc. In these implementations, the data structure represents the row as having been deleted even though the data for that row is not physically removed. Instead, there may be a periodic operation, such as garbage collection, when rows marked for deletion are actually removed—for example, by freeing the memory used by the deleted rows or by overwriting the deleted rows with non-deleted rows.

Returning to operation 230, if, in operation 230, the requirements generation device 110 determines that the answer received in operation 225 was not "yes," the requirements generation device 110 proceeds to operation 240.

In operation 240, the requirements generation device 110 adds the answered question and the corresponding no-condition requirements to the requirements table, deletes the answered question, and deletes any yes-condition requirements or no-condition requirements that correspond to the answered question from the entire table. For example, in operation 240, the requirements generation device 110 may walk the entire questions table 310, delete every instance in the questions table 310 of each yes-condition requirement that corresponds to the question answered in operation 225, and delete every instance in the questions table 310 of each no-condition requirement that corresponds to the question answered in operation 225.

Figure 3D:
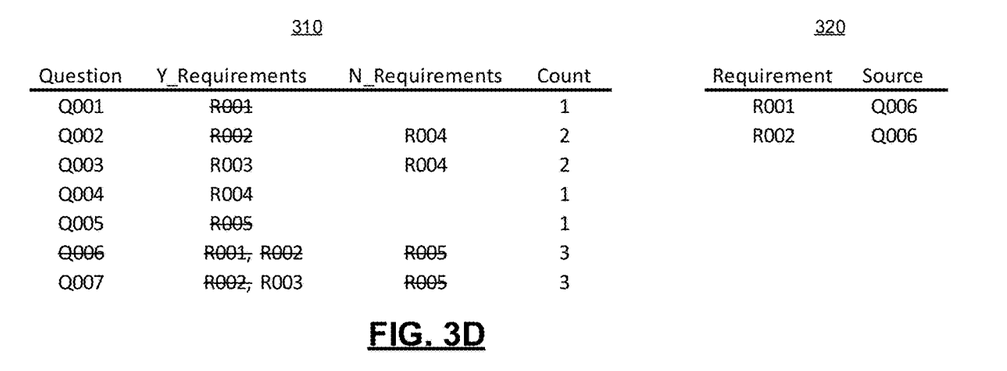

In the example illustrated in FIGS. 3A-3G, the answer to sixth question Q006 received during a first iteration of operation 225 was "yes," and thus, operations 230 and 235 are performed. For example, FIG. 3D illustrates an example state of a questions table 310 after operation 235. As is illustrated in FIG. 3D, in accordance with operation 235, the sixth question Q6 is added to a requirements table 320 along with the yes-condition requirements corresponding to the sixth question Q6, first requirement R001 and second requirement R002. Further, in accordance with operation 235, the sixth question Q6 is deleted from the questions table 310; the yes-condition requirements corresponding to the sixth question Q6, first requirement R001 and second requirement R002, are deleted from the entire questions table 310; and the no-condition requirement corresponding to the sixth question Q6, fifth requirement R005, is deleted from the entire questions table 310.

Returning to FIG. 2, after either one of operations 235 and 240, the requirements generation device 110 proceeds to operation 245.

Figure 3E:
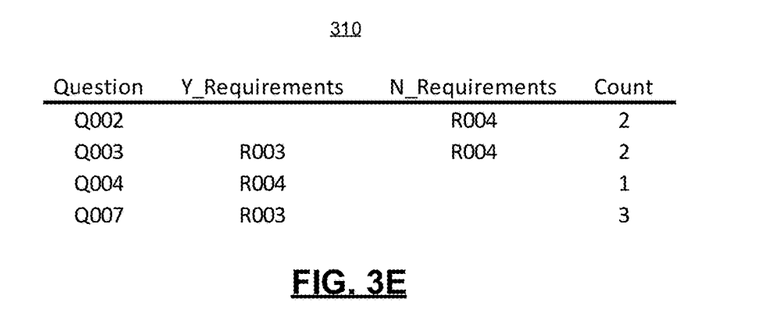

In operation 245, the requirement generation device 110 removes, from the questions table 310, each question that corresponds to zero requirements. Referring to FIG. 3D, after operation 235, the first question Q001 corresponds to zero requirements because the sole requirement to which the first question Q001 corresponded, first requirement R001, is deleted in operation 235. Further, the fifth question Q005 corresponds to zero requirements because the sole requirement to which the fifth question Q005 corresponded, fifth requirement R005, is deleted in operation 235. Thus, in operation 245, the requirements generation device 110 deletes the first question Q001 and fifth question Q005 from the questions table 310. For example, FIG. 3E illustrates an example state of a questions table 310 after operation 245. As is illustrated in FIG. 3E, the first question Q001, the fifth question Q005, and the sixth question Q006 are no longer present in the questions table 310.

After operation 245, the requirement generation device 110 proceeds to operation 250 and determines whether the questions table 310 is empty. If the requirements generation device 110 determines that questions table 310 is empty, the requirement generation device proceeds to operation 255.

In operation 255, the requirement generation device 110 displays the requirements table 320 to the SME. For example, the requirement generation device 110 may display the requirements table 320 to the SME via a display (e.g., display panel or monitor) of the requirement generation device 110 or, if the SME is communicating with the requirement generation device via one of the first through fourth user device 140-1-140-4, the requirement generation device 110 may display the requirements table 320 to the SME by causing the user device being used by the SME to display the requirements table 320.

Returning to operation 250, if, in operation 250, the requirements generation device 110 determines that questions table 310 is not empty, the requirement generation device returns to operation 215.

In the example illustrated in FIGS. 3A-3G, the questions table 310 is not empty. For example, as is illustrated in FIG. 3E, the questions table 310 still includes questions. Thus, in accordance with operation 250, the requirement generation device 110 proceeds to operation 215 for the second time.

Figure 3F:
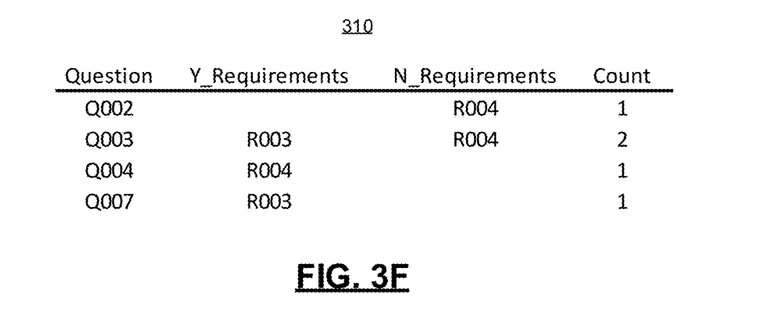

In operation 215, the requirements generation device 110 recalculates the count values of the questions in the questions table 310. In the example illustrated in FIGS. 3A-3H, the count values for the second question Q002 and the seventh question Q007 are both updated to the value "1" due to the previous deletions of the second and fifth question Q002 and Q005 from the entire questions table 310. For example, FIG. 3F illustrates an example state of a questions table 310 after operation 215.

After operation 215, the requirements generation device 110 proceeds to operation 220. In the example illustrated in FIGS. 3A-3H, the third question Q003 is determined to have the highest count value. Thus, in operation 220, the third question Q003 is displayed to the SME.

Figure 3G:
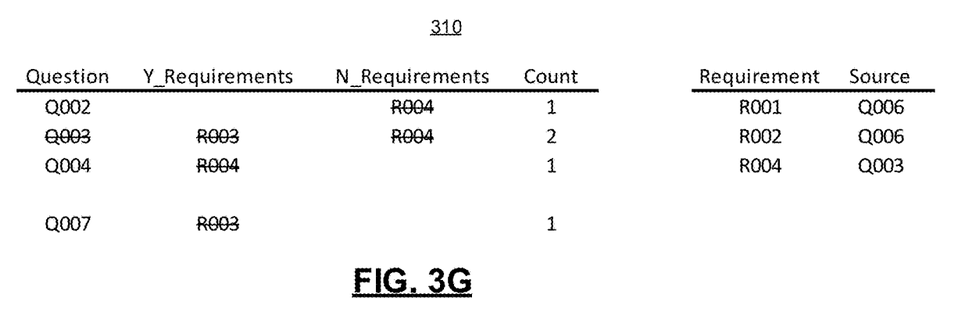

In the example illustrated in FIGS. 3A-3H, the answer received for the third question Q003 during the second iteration of operation 225 is "no." Thus, in accordance with operation 230, the requirements generation device 110 proceeds to operation 240. Further, in accordance with operation 240, the requirements generation device 110 adds the third question Q003 to the requirements table 320 along with the no-condition requirement corresponding to the third question Q003, fourth requirement R004. Further, in accordance with operation 240, the requirements generation device 110 deletes the third question Q003 from the questions table 310; and the requirements generation device 110 deletes the no-condition requirement corresponding to the third question Q003, fourth requirement R004, and the yes-condition requirement corresponding to the third question Q003, third question R003, from the entire questions table 310. For example, FIG. 3G shows states of the questions table 310 and the requirements table 320 operation 240. After the second iteration of operation 225, the requirements generation device 110 proceeds to operation 245 for the second time.

Figure 3H:
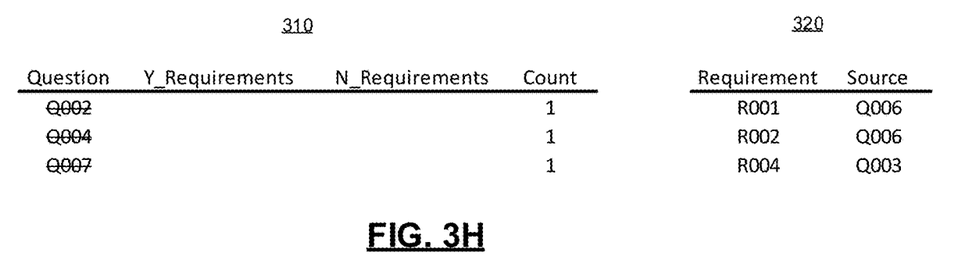

As is shown in FIG. 3G, no requirements exist for any of the remaining questions (i.e., the second question Q002, the fourth question Q004, and the seventh question Q007). Thus, in accordance with the second iteration of operation 245, the requirements generation device 110 deletes the second question Q002, the fourth question Q004, and the seventh question Q007 from the questions table 310. For example, FIG. 3H shows states of the questions table 310 and the requirements table 320 after operation S245. After operation 245, the requirements generation device 110 proceeds to operation 250 for the second time.

As is illustrated by FIG. 3H, the questions table 310 is now empty. Accordingly, during the second iteration of operation 250, the requirements generation device 110 determines that the questions table 310 is empty, and thus, the requirements generation device 110 proceeds to operation 255 and displays the requirements table 320 to the SME.

Accordingly, though there were originally five questions in the questions table 310, before the fifth and sixth questions Q005 and Q006 were added in operation 210, by using the requirements identification process discussed above with reference to FIG. 5, only three questions (i.e., the sixth and third questions Q006 and Q003) were asked of the SME. This represents a 60% decrease in the total number of questions asked.

Consequently, by performing requirements generation in accordance with the requirements identification process discussed above with reference to FIG. 2, the requirements generation device 110 may reduce the amount of time needed to perform requirements generation. Consequently, the requirements generation device 110 may improve the functioning of the requirements generation system 100 by reducing one or more of a duration of use, an amount of power consumption and/or a computational burden of the requirements generation system 100.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
   memory storing computer-executable instructions; and
   a processor configured to execute the computer-executable instructions, to cause the processor to generate requirements for a project by,
      building a questions table including a plurality of first questions and a plurality of potential requirements to which the plurality of first questions correspond, respectively,
      adding, to the questions table, one or more second questions each of which correspond to at least two requirements from among the plurality of potential requirements,
      adding, to the questions table, for each second question among the one or more second questions, the at least two requirements to which the second question corresponds,
      determining a question, from among the first questions and the second questions, that corresponds to a highest number of potential requirements,
      displaying the determined question to a user, and
      receiving an answer to the displayed question, the answer being a selected one of at least two options,
      adding, to a requirements table, ones of the potential requirements assigned to the selected one of the at least two options for the answered question as the requirements for the project such that other ones of the potential requirements assigned to a non-selected one of the at least two options for the answered question are determined as not being one of the requirements for the project.

2. The computer system of claim 1, wherein the computer-executable instructions include:
   deleting the answered question from the questions table such that one or more of a duration of time, an amount of power consumption and a computational burden to generate the requirements is reduced.

3. The computer system of claim 2, wherein the computer-executable instructions include:
   deleting, from the questions table, all of the potential requirements corresponding to each of the at least two options for the answered question from the entire questions table such that the ones of the potential requirements corresponding to the answered question are removed from each of remaining one of the first questions and the second questions in the question table.

4. The computer system of claim 3, wherein the computer-executable instructions include:
   determining one or more questions, from among the plurality of first questions and one or more second questions included in the questions table, that correspond to no requirements included in the questions table, and
   deleting the determined one or more questions from the questions table.

5. The computer system of claim 4, wherein the computer-executable instructions include:
   determining whether the questions table is empty, and
   in response to determining that the questions table is empty, displaying the requirements table to the user.

6. The computer system of claim 4, wherein the computer-executable instructions include:
   determining whether the questions table is empty, and
   in response to determining that the questions table is not empty,
      determining a next question, from among questions remaining in the questions table, that corresponds to a highest number of potential requirements, and
      displaying the determined next question to the user.

7. The computer system of claim 6, wherein the computer-executable instructions include:
   receiving an answer to the displayed next question, and
   deleting the answered next question from the questions table.

8. A method of generating requirements for a project, the method comprising:
building a questions table including a plurality of first questions and a plurality of potential requirements to which the plurality of first questions correspond, respectively;
adding, to the questions table, one or more second questions each of which correspond to at least two requirements from among the plurality of potential requirements;
adding, to the questions table, for each second question among the one or more second questions, the at least two requirements to which the second question corresponds;
determining a question, from among the first questions and the second questions, that corresponds to a highest number of potential requirements;
displaying the determined question to a user;
receiving an answer to the displayed question, the answer being a selected one of at least two options; and
adding, to a requirements table, ones of the potential requirements assigned to the selected one of the at least two options for the answered question as the requirements for the project such that other ones of the potential requirements assigned to a non-selected one of the at least two options for the answered question are determined as not being one of the requirements for the project.

9. The method of claim 8, further comprising:
deleting the answered question from the questions table.

10. The method of claim 9, further comprising:
deleting, from the questions table, all of the potential requirements corresponding to each of the at least two options for the answered question from the entire questions table such that the ones of the potential requirements corresponding to the answered question are removed from each of remaining one of the first questions and the second questions in the question table.

11. The method of claim 10, further comprising:
determining one or more questions, from among the plurality of first questions and one or more second questions included in the questions table, that correspond to no requirements included in the questions table; and
deleting the determined one or more questions from the questions table.

12. The method of claim 11, further comprising:
determining whether the questions table is empty; and
in response to determining that the questions table is empty, displaying the requirements table to the user.

13. The method of claim 11, further comprising:
determining whether the questions table is empty; and
in response to determining that the questions table is not empty,
determining a next question, from among questions remaining in the questions table, that corresponds to a highest number of potential requirements, and
displaying the determined next question to the user.

14. The method of claim 13, further comprising:
receiving an answer to the displayed next question; and
deleting the answered next question from the questions table.

15. A non-transitory computer-readable medium storing computer-executable instructions that, when executed by a processor, cause the processor to generate requirements for a project by:
building a questions table including a plurality of first questions and a plurality of potential requirements to which the plurality of first questions correspond, respectively;
adding, to the questions table, one or more second questions each of which correspond to at least two requirements from among the plurality of potential requirements;
adding, to the questions table, for each second question among the one or more second questions, the at least two requirements to which the second question corresponds;
determining a question, from among the first questions and the second questions, that corresponds to a highest number of potential requirements;
displaying the determined question to a user; and
receiving an answer to the displayed question, the answer being a selected one of at least two options;
adding, to a requirements table, ones of the potential requirements assigned to the selected one of the at least two options for the answered question as the requirements for the project such that other ones of the potential requirements assigned to a non-selected one of the at least two options for the answered question are determined as not being one of the requirements for the project.

16. The non-transitory computer-readable medium of claim 15, wherein the computer-executable instructions include:
deleting the answered question from the questions table.

17. The non-transitory computer-readable medium of claim 16, wherein the computer-executable instructions include:
deleting, from the questions table, all of the potential requirements corresponding to each of the at least two options for the answered question from the entire questions table such that the ones of the potential requirements corresponding to the answered question are removed from each of remaining one of the first questions and the second questions in the question table.

18. The non-transitory computer-readable medium of claim 17, wherein the computer-executable instructions include:
determining one or more questions, from among the plurality of first questions and one or more second questions included in the questions table, that correspond to no requirements included in the questions table; and
deleting the determined one or more questions from the questions table.

19. The non-transitory computer-readable medium of claim 18, wherein the computer-executable instructions include:
determining whether the questions table is empty; and
in response to determining that the questions table is empty, displaying the requirements table to the user.

20. The non-transitory computer-readable medium of claim 18, wherein the computer-executable instructions include:
determining whether the questions table is empty; and
in response to determining that the questions table is not empty,
determining a next question, from among questions remaining in the questions table, that corresponds to a highest number of potential requirements, and
displaying the determined next question to the user.

* * * * *